United States Patent
Palo et al.

(10) Patent No.: US 8,696,771 B2
(45) Date of Patent: Apr. 15, 2014

(54) COMPACT INTEGRATED COMBUSTION REACTORS, SYSTEMS AND METHODS OF CONDUCTING INTEGRATED COMBUSTION REACTIONS

(75) Inventors: Daniel R. Palo, Philomath, OR (US); Jamelyn D. Holladay, Kennewick, WA (US); Robert A. Dagle, Richland, WA (US); Robert T. Rozmiarek, Middleton, WI (US)

(73) Assignee: Battelle Memorial Institute, Richland, WA (US)

( * ) Notice: Subject to any disclaimer, the term of this patent is extended or adjusted under 35 U.S.C. 154(b) by 937 days.

(21) Appl. No.: 11/611,461

(22) Filed: Dec. 15, 2006

(65) Prior Publication Data

US 2007/0172402 A1 Jul. 26, 2007

Related U.S. Application Data

(60) Provisional application No. 60/751,125, filed on Dec. 16, 2005.

(51) Int. Cl.
*C01B 6/24* (2006.01)
*B01J 7/00* (2006.01)

(52) U.S. Cl.
USPC ............... 48/61; 48/197 R; 422/625; 423/644

(58) Field of Classification Search
USPC ...................................... 48/61, 197 R, 127.3
See application file for complete search history.

(56) References Cited

U.S. PATENT DOCUMENTS

| | | | |
|---|---|---|---|
| 5,015,444 A | 5/1991 | Koga et al. | |
| 5,324,452 A | 6/1994 | Allam et al. | |
| 5,534,328 A | 7/1996 | Ashmead et al. | |
| 5,776,421 A | 7/1998 | Matsumura et al. | |
| 5,811,062 A | 9/1998 | Wegeng et al. | |
| 5,846,494 A | 12/1998 | Gaiser | |
| 5,858,314 A | 1/1999 | Hsu et al. | |
| 5,861,137 A | 1/1999 | Edlund et al. | |
| 6,117,578 A | 9/2000 | Lesieur | |
| 6,129,973 A | 10/2000 | Martin et al. | |
| 6,143,943 A | 11/2000 | Oroskar et al. | |
| 6,159,358 A | 12/2000 | Mulvaney et al. | |
| 6,159,434 A * | 12/2000 | Gonjo et al. ................. | 422/191 |

(Continued)

FOREIGN PATENT DOCUMENTS

EP 1090878 A1 8/2000

OTHER PUBLICATIONS

PCT Int'l Search Report and Written Opinion, mailed Jun. 14, 2007, PCT/US2006/047936.

(Continued)

*Primary Examiner* — Matthew Merkling
(74) *Attorney, Agent, or Firm* — Derek H. Maughan; Frank Rosenberg (57) ABSTRACT

A compact integrated combustion reactor is described. In a preferred embodiment, the combustion catalyst is disposed in a staggered configuration such that the hot spot in an adjacent endothermic reaction chamber is substantially less than would occur with a conventional, unstaggered configuration. The integrated reactor may also include a methanation chamber for methanation of a reformate product. Systems containing reactant and product streams, and methods of conducting integrated combustion reactions are also described. A staggered catalyst conformation can be used more broadly for thermal chemical reactions requiring heat transfer in a layered device.

28 Claims, 5 Drawing Sheets

(56) References Cited

U.S. PATENT DOCUMENTS

| | | | |
|---|---|---|---|
| 6,192,596 | B1 | 2/2001 | Bennett et al. |
| 6,200,536 | B1 | 3/2001 | Tonkovich et al. |
| 6,203,587 | B1 | 3/2001 | Lesieur et al. |
| 6,277,339 | B1 | 8/2001 | Boneberg et al. |
| 6,289,667 | B1 * | 9/2001 | Kolaczkowski et al. ........ 60/777 |
| 6,537,506 | B1 | 3/2003 | Schwalbe et al. |
| 7,077,643 | B2 | 7/2006 | Holladay et al. |
| 7,208,136 | B2 | 4/2007 | Holladay et al. |
| 2004/0033455 | A1 * | 2/2004 | Tonkovich et al. ................ 431/7 |
| 2004/0089438 | A1 * | 5/2004 | Valensa et al. .................... 165/4 |
| 2004/0223908 | A1 | 11/2004 | Holladay et al. |
| 2004/0244290 | A1 | 12/2004 | Yamamoto et al. |

OTHER PUBLICATIONS

Holladay et al., "High efficiency and low carbon monoxide microscale methanol processors," J. Power Sources 131 (2004) 69-72.

Holladay et al., "Microfuel processor for use in a miniature power supply," J. Power Sources 108 (2002) 21-27.

Hu et al., "Fuel processing for portable power applications," Chem. Eng. J. 93 (2003) 55-60.

Dagle et al., "Selecctive CO methanation catalysts for fuel processing applications," Appl. Catal. A: General 326 (2007) 213-218.

Palo et al. "Development of a soldier-portable fuel cell power system Part I: A bread-board methanol fuel processor," J. Power Sources 108 (2002) 28-34.

* cited by examiner

Fig. 1

Normal Configuration:
One piece of catalyst on outlet end of channel.
Hot zone (▩) near center where most of combustion occurs.

Staggered Configuration:
Several pieces of catalyst (three shown) staggered along length of channel.
Baffles direct equal amounts of gas through each catalyst bed.
Hot zones (▩) are staggered along length of bed.

COMPACT INTEGRATED COMBUSTION REACTORS, SYSTEMS AND METHODS OF CONDUCTING INTEGRATED COMBUSTION REACTIONS

RELATED APPLICATIONS

In accordance with 35 U.S.C. sect. 119(e), this application claims priority to U.S. Provisional Application No. 60/751,125 filed 16 Dec. 2005.

INTRODUCTION

Microchannel devices have generated great interest due to their reduced distances for heat and mass transport and corresponding ability for greater volumetric productivity. An early microchannel, laminated mass exchanger used an external source for heat exchange and this device is described in U.S. Pat. No. 6,533,840. Other laminated microchannel devices have employed integrated combustion to provide heat for an endothermic process in an adjacent layer.

An example of a compact alcohol steam reformer/catalytic combustor with integrated methanation is shown in a published U.S. patent application Ser. No. 2004/0223908 to Holladay et al.

Despite this and other work over many years, there remains a need for compact and efficient steam reformers, and integrated combustors with reduced hot spots.

SUMMARY OF THE INVENTION

Figure 1:
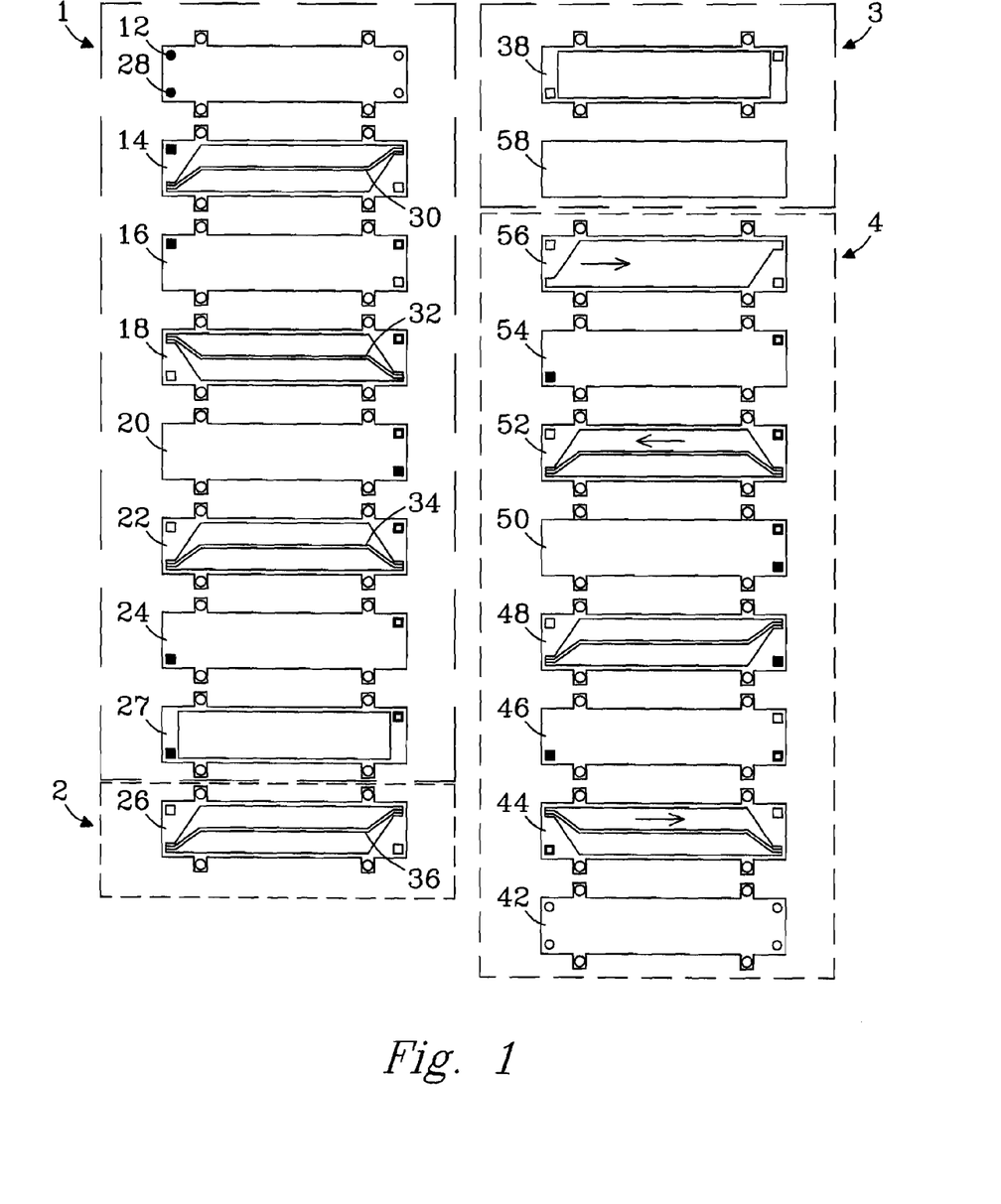
FIG. 1 illustrates a sequence of plates that was (subsequently) laminated to form a compact integrated steam reformer/combustor with methanizer.

In a first aspect, the invention provides a compact steam reformer, comprising: a reactant preheat section; a steam reforming reaction chamber comprising a steam reforming catalyst; wherein the steam reforming reaction chamber is in conductive thermal contact with the reactant preheat section such that, during operation, heat from the steam reforming reaction chamber can be conducted directly across (here, "directly across" means perpendicular to flow, not along the length of a chamber wall) a reaction chamber wall into the reactant preheat section; wherein the reactant preheat section comprises an inlet and an outlet, and wherein the reactant preheat section outlet is disposed such that, during operation, flow from the reactant preheat section outlet flows into the steam reforming reaction chamber; a combustion chamber adjacent to the steam reforming reaction chamber and separated from the steam reforming reaction chamber by a chamber wall; wherein the combustion chamber comprises a combustion catalyst; and a combustion preheat chamber; wherein the combustion chamber is in conductive thermal contact with the combustion preheat section such that, during operation, heat from the combustion chamber can be conducted through a combustion chamber wall into the combustion preheat section; wherein the combustion chamber comprises an inlet and an outlet, and wherein the combustion chamber outlet is disposed such that, during operation, flow from the combustion chamber outlet flows into the combustion preheat section. Although heat is transferred directly across a reaction chamber wall, the reformer preheat section (as well as the combustor preheat section) preferably includes several layers in which additional heat is transferred directly across a wall. An example is shown in FIG. 1. In a preferred embodiment, this compact steam reformer further includes a methanation catalyst disposed in the reactant preheat section. Preferably, the reactant preheat section comprises: methanator, vaporizer and superheat subsections. In some embodiments, catalyst in steam reforming and/or catalyst sections are flow-by. The catalyst in any or all of the reaction sections may include a large pore catalyst. Preferably, the combustion channel has at least one dimension of 5 mm or less. In preferred embodiments, there are vaporizer and superheat sections in the combustion preheat section. Preferably, there is a staggered catalyst in the combustion chamber The invention also includes the prebonded assembly having the structure used to form a laminated device having the structure of the compact steam reformer described herein. Further, the invention includes a method of making a compact steam reformer comprising assembling the components of the prebonded assembly and bonding the assembly. The invention further includes methods of making prebonded assemblies and/or bonded articles for the components and integrated steam reformer described herein, for example, by stacking plates. The component assemblies can be bonded separately or stacked with component assemblies and bonded together. "Bonding" can be any method to adhere plates together to form a device that essentially does not leak during operation. In some preferred embodiments, diffusion bonding is used to seal together a subassembly or entire device. In some preferred embodiments, a combination of bonding methods are used, such as diffusion bonding, welding, and/or brazing.

In another aspect, the invention provides a compact steam reformer system, comprising: the compact steam reformer as described herein and including reactants and products flowing through the steam reformer. The system may, optionally, also be characterized by conditions or measurements of system outputs.

The invention also includes a method of producing $H_2$ comprising passing CO and $H_2O$ into the above-described compact steam reformer.

In another aspect, the invention provides apparatus for integrated combustion (or, more broadly, for integrated thermal reactions with heat transfer), comprising: a combustion chamber (or, more broadly, a first reaction chamber) having a width, length and height; an endothermic reaction chamber (or, more broadly, a second reaction chamber) disposed adjacent to the combustion chamber; wherein the height of the combustion chamber is 10 mm or less; an endothermic reaction chamber that is adjacent to the combustion chamber; wherein the combustion chamber length is defined in the direction of flow through the combustion chamber, and begins at a point where flow first encounters catalyst and ends where flow last encounters the catalyst; wherein height is in the direction of heat transfer from the combustion chamber to the endothermic reaction chamber; and wherein a combustion catalyst is staggered over the width of the combustion chamber, such that, at the beginning of the combustion chamber's length, catalyst is present in no more than 70% of the combustion chamber's width. In some preferred embodiments: the height and width of the combustion channel are substantially constant over entire length of combustion chamber; the apparatus is a laminated assembly; combustion catalyst extends over entire width of combustion chamber; ribs are disposed between catalyst sections; catalyst is flow-through; catalyst is flow-by; the flow resistance of each section is essentially the same as a function of width; each section is same length; catalyst is wall-coating or an insert; the staggered catalyst comprises at least 3 sections of catalyst each having equal length and width; and, the combustion catalyst comprises porous catalysts of different porosity, thickness, and/or length resulting in pressure drop differences for their respective areas.

The invention also provides a method of conducting integrated combustion (or, more broadly, integrated thermal reactions with heat transfer) wherein the hot spot created in the endothermic reaction chamber is at least 20% lower than the hot spot created under identical conditions with an unstaggered catalyst (in other words, a catalyst of the same composition, loading and volume but with only a single front edge where flow meets catalyst along the length of a reaction channel). A "hot spot" is the spike in temperature at the heat transfer wall that exceeds the average temperature that is averaged over the area of the heat transfer wall that is adjacent to the combustion catalyst.

The invention also includes a system comprising a staggered catalyst along with a fuel and an oxidant passing through the combustion chamber. The system may, optionally, also be characterized by conditions or measurements of system outputs.

Also, the invention provides a prebonded assembly comprising the structure including the staggered catalyst described above.

An advantage of the staggered catalyst configuration is that it spreads out heat over more of the length of the thermally conductive wall. In some embodiments, the exothermic reaction can include combustion, partial oxidation, selective oxidation, hydrogenation, Fischer-Tropsch, and alkylation reactions. In one embodiment, staggered catalyst comprises use of differing amount of catalyst support structure or active catalyst metal in one cross sectional area of the process channel as compared to a second cross sectional area downstream relative to intended flow direction of process fluids.

In another aspect, the invention provides a laminated apparatus for integrated thermal reaction, comprising the following layers in stacked in sequential order: an endothermic preheat layer; an endothermic reaction chamber; an exothermic reaction chamber; and an exothermic preheat layer. A reaction chamber wall separates the endothermic reaction chamber and the exothermic reaction chamber. A first fluid flow path connects the endothermic preheat layer with the endothermic reaction chamber; and a second fluid flow path connects the exothermic preheat layer with the exothermic reaction chamber. A preferred embodiment of this laminated apparatus (shown before assembly) is illustrated in FIG. 1. The invention also includes methods of conducting thermal reactions in the apparatus.

Another aspect of this invention is the method of making a laminated device, comprising: forming at least two sub-assemblies of shims, each representing some of the flow channels in the final apparatus, applying a second manufacturing step such as a material addition (typically catalyst or adsorbent) or modification to one or more of the sub-assemblies, and then combining a plurality of sub-assemblies to form a final assembly. Typically, the step of combining a plurality of sub-assemblies comprises welding together at least two sub-assemblies. In some embodiments, separate stacks of sheets are diffusion bonded to form 2, 4, or more separate subassemblies; then welded together. In some embodiments, a catalyst insert or adsorbent insert is placed into a cavity in a first subassembly and then welding a second sub-assembly onto the first such that the insert is sealed within the welded stack.

The invention also provides a method of refurbishing a laminated reactor in which the apparatus is cut along a weld and replacing the catalyst. Conveniently, this can be done along the weld between steam reformer sheet 26 (see FIG. 1) and steam reformer catalyst sheet 38.

Various embodiments of the invention may provide advantages, including: reduced hot spot in an exothermic reaction chamber, and, in an integrated reactor, the endothermic reaction chamber to which heat is transferred, improved temperature control, high efficiency, ease of assembly, and superior performance in a compact device.

DESCRIPTION OF SOME PREFERRED EMBODIMENTS

In preferred embodiments of the invention, the channels are microchannels. Any of the channels (also called chambers) can be sized to have microchannel dimensions. A "microchannel" is a channel having at least one internal dimension (wall-to-wall, not counting catalyst) of 1 cm or less, preferably 2 mm or less (in some embodiments about 1.0 mm or less) and greater than 100 nm (preferably greater than 1 μm), and in some embodiments 50 to 500 μm. Microchannels are also defined by the presence of at least one inlet that is distinct from at least one outlet. Microchannels are not merely channels through zeolites or mesoporous materials. The length of a microchannel corresponds to the direction of flow through the microchannel. Microchannel height and width are substantially perpendicular to the direction of flow of through the channel. In the case of a laminated device where a microchannel has two major surfaces (for example, surfaces formed by stacked and bonded sheets), the height is the distance from major surface to major surface and width is perpendicular to height.

FIG. 1 illustrates a preferred embodiment of an integrated combustion reactor according to the present invention. The device is broadly divided into 4 sections: a vaporizer/preheat section 1, a steam reformer 2 (fluid flow path), 3 (porous catalyst), and a combustor and a fuel vaporizer/preheat section 4. In the illustrated embodiment, water and hydrogen source (such as alcohol) enter through reactant device inlet 12, passing through a via in methanator plate 14 and thin plate (also called a "shim") 16 and into vaporizer 18 and the resulting vapor passes through a via in plate 20 and into superheat plate 22. The superheated reactants then pass through plate 24 and into a steam reforming reaction chamber in plate 26. The steam reforming chamber contains a bulk flow path in plate 26 and a porous catalyst (not shown) located in the openings in plates 27, 38. The steam reforming reaction chamber contains a steam reforming catalyst. A product stream, comprising $H_2$, CO, $CH_4$, and $CO_2$, as well as unconverted reactants, pass though a passage in the plate stack into a methanator 14 which contains a methanation catalyst. In the methanator, CO is converted to produce a low-CO stream that could be passed into a fuel cell, gas separator, storage, etc. In the illustrated device, product gas flows out through outlet 28. Ribs 30, 32, 34, 36 provide structural support and help control flow. In many preferred embodiments, the methanation reaction is conducted at a lower temperature than the steam reforming reaction, so the reformate product gases preferably lose some heat before they enter the methanator. As can be seen, the plate construction provides layers in a laminated device. In some embodiments, a preferential oxidation catalyst in a preferential oxidation reactor may be used in place of, or in addition to, the methanation catalyst and reactor. For example, in some embodiments, plate 14 could be a preferential oxidation reactor that preferentially oxidizes CO to $CO_2$.

On the other side of the device, fuel and oxidant (typically air) enter in an inlet orifice on end plate 42, across preheat/vaporizer 44, through thin plates 46, 48, 50 and across preheater 52, through plate 54 and into combustor 56. Typically, the combustor contains a combustion catalyst. Heat from the combustor travels through plate 58 into the steam reforming reaction chamber. The plates bordering reaction chambers form reaction chamber walls. Heat passes into the reformer through one wall and out through another wall.

The device illustrated in FIG. 1, either with or without a methanation catalyst, was used in the Examples. The plates were formed of stainless steel having a thickness of 0.015 inch, except plate 58 which had a thickness of 0.047 inch and plates 24, 54 which were each formed of two shims. All patterning was through holes cut through a sheet, and the sheets were stacked and diffusion bonded. Plates in box 1 and 4 of FIG. 1 were bonded together, in separate stacks. SR catalyst sheet(s) were placed in the open shim of FIG. 1, with Shim 2 on top, followed by the open shim in box 3 with another SR catalyst sheet. The combustor catalyst sheets were placed as desired in the open shim in box 4. The two stacks were then placed on top of each other with shim 58 between them forming a sandwich. The sandwich is then welded together. The methanizer was formed from 4 shims for a total reaction chamber height of 0.06 inch. The methanation powder catalyst, when used, was added to the reactor through holes (not shown) which were welded shut after the catalyst was in place. It should be recognized that FIG. 1 is merely illustrative of a preferred embodiment of the invention and is not intended to limit the scope of the invention.

Various materials or combinations of materials can be used to make a compact reformer. The materials are preferably resistant to steam or oxygen corrosion and are capable of long term use at the operation temperatures. Such materials are well-known. Typically, a metal such as stainless steel is used to make the compact reactor. A wick may be used in channels that transport liquids. Wicks can be selective for transporting desired liquids to an outlet or from an inlet. Wicking materials are also well-known and hydroscopic materials (e.g. silica) or materials with hydrophilic surface properties may be employed as wicks. Plates and microchannels can be made of various dimensions depending on desired properties. For example, a somewhat thicker plate (about 0.1 inch, 0.25 cm) between the reformer and combustor could be used for better temperature distribution.

In some embodiments, there is no elemental silicon or doped silicon in the device, for example, the reactor walls are not composed of silicon. To avoid heat loss and increase thermal efficiency, the reactor walls are preferably as thin as possible.

Reactor configurations include, but are not limited to, the designs described in connection with FIG. 1. The components of an integrated combustor/reformer may include: a combustion chamber, a reforming chamber (or other heat sink), a wall separating the combustion and reforming chambers, a preheater or preheat zone, a vaporizer or vaporizing zone, and a methanation chamber or methanation zone. The combustion chamber and reforming chamber are oriented so that heat is transferred from the combustion chamber into the reforming chamber. Both the combustor and reformer should have a separate preheater (and/or a vaporizer) or a preheat zone (and/or a vaporizer zone) integrated within the device in which reactants are preheated (and/or vaporized) prior to contacting a catalyst.

In a layered device, the direction of flow in the various layers may be either co-current, counter-current, or cross-flow.

The invention is especially well-suited to compact devices. The combustion chamber (or other exothermic process chamber) preferably has a volume/power ratio of 0.017 $ml/W_e$ or less; more preferably 0.011 $ml/W_e$ or less. In some preferred embodiments, the volume/power ratio of the combustion chamber is in the range of 0.007 and 0.004 $ml/W_e$. In some embodiments, a reforming chamber in thermal contact with the combustion chamber has dimensions that are similar to, or the same as, the dimensions of the combustion chamber. In some other embodiments, the reforming chamber (or other endothermic process chamber) has a volume/power ratio of 0.03 $ml/W_e$ or less; more preferably 0.02 $ml/W_e$ or less; in some embodiments 0.009 $ml/W_e$ or less. The volume of the combustion chamber is the volume where catalyst is present, either as a packed bed, a porous monolith, or a wall coating of a channel through which travels fuel and combustion products (a bulk flow path past a combustion catalyst is included as part of the volume of the combustion chamber where catalyst is present. The volume of the reactor walls is not included in the calculation. In the case of a staggered catalyst, the length of a reaction chamber is determined by the furthest extending catalyst(s) in the length direction. The electric power is estimated from the thermal power of the hydrogen produced and assumes that a fuel cell utilizes 80% of the hydrogen and that the fuel cell is 60% efficient.

The overall volume/power ratio of an integrated microreformer device (including preheat, combustion and reforming chambers, and optional methanation zone) is preferably 0.82 $ml/W_e$ or less, more preferably 0.55 $ml/W_e$ or less, and in some embodiments 0.27 $ml/W_e$ or less. The volume includes the volume of channel walls.

In preferred embodiments, the integrated combustor/reformer does not contain any $H_2$-selective membranes to filter a gas (for example, no Pd or Pd-alloy membranes), and/or does not contain any preferential oxidation catalyst or oxygen inlets so that no reformate product stream is preferentially oxidized.

The combustion catalyst can be any known combustion catalyst. Typical for the devices described in the examples was 5% Pt on alumina wash coated onto a FeCrAlY felt. Combustion catalysts and combustion catalysts suitable for use in microchannels are well known. Some preferred examples include Pt and/or Pd.

Catalyst compositions suitable for methanol steam reforming include CuZnAl, Pd/ZnO, and supported Ru, Pt, and Rh catalysts. Pd/ZnO catalysts are preferred since they are not pyrophoric and can possess excellent performance properties. In preferred embodiments, the steam reforming catalyst is characterizable as having a $H_2$ productivity of at least 100 Nm3/kg·Pd/h at 240° C. and/or a methanol conversion of at least 70% and a CO selectivity of 2% or less at 260° C. These performance properties are to be measured as described in the quartz tube testing procedures of the Examples section. In preferred embodiments, Pd/ZnO is dispersed on a support, preferably a metal oxide support. Alumina is a particularly desirable support because of its low cost, high surface area, and good interaction with Pd/ZnO. In some preferred embodiments, the catalyst contains 2 to 10 weight % Pd (including the weight of the support, typically a metal oxide, upon which the Pd/ZnO is dispersed, but not including any underlying material such as a metal felt or foam), and in some embodiments 5 to 10 wt %. In some preferred embodiments, the steam reforming catalyst has a Pd:Zn molar ratio of 0.1 to 0.8, more preferably 0.2 to 0.5, and still more preferably 0.30 to 0.45. In some preferred embodiments, a Pd/Zn catalyst is prepared by co-precipitating Pd and Zn; these components may be coprecipitated using inorganic or organometallic precursors. Prior to steam reforming, the steam reforming catalyst is advantageously subjected to an activation treatment, preferably reduction at 300-400° C.

In some embodiments, methanation catalysts for use in the present invention can be any of the known methanation catalysts. In preferred embodiments, the methanation catalyst has ruthenium distributed on the surface of an alumina support. In some preferred embodiments Ru is present in a range of 2 to 4%. In some preferred embodiments, the weight ratio of Ru to alumina is at least 0.03, and in some embodiments, 0.03 to 0.1. In some particularly preferred embodiments, a $Ru/Al_2O_3$ catalyst is disposed over the surface of a porous support such as a felt.

The function of the methanation catalyst is to reduce CO in the output of the reformer. Therefore, the methanation catalyst should be disposed so that CO produced in the reforming reaction can be converted to methane. Because methanation catalysts can operate at temperatures that are similar to or the same as reforming catalysts, a methanation catalyst can alternatively, or in addition, be disposed in contact with the reforming catalyst, either adjacent or mixed with a reforming catalyst. If it is mixed, this mixing is preferably in the downstream portion of the reforming catalyst.

Particularly useful for any of the combustion, reforming and/or methanation catalysts are catalysts having very high porosity, for example, at least about 80%, and large pore sizes, for example, up to 200 μm, so as to facilitate a high mass transfer at low pressure differential. Such catalyst is a preferred way to maintain a small-size reactor. A very high activity catalyst is not required, but high activity catalysts can be used, which can result in smaller devices with larger processing rates.

The catalysts may take any conventional form such as a powder or pellet. In some preferred configurations, a catalyst includes an underlying large pore support. Examples of preferred large pore supports include commercially available metal foams and, more preferably, metal felts. The large pore support has a porosity of at least 5%, more preferably 30 to 99%, and still more preferably 70 to 98%. Preferably, the support has a volumetric average pore size, as measured by BET, of 0.1 μm or greater, more preferably between 1 and 500 μm. Preferred forms of porous supports are foams and felts and these are preferably made of a thermally stable and conductive material, preferably a metal such as stainless steel or FeCrAlY alloy. These porous supports can be thin, such as less than 10 mm, less than 5 mm, or between 0.1 and 1 mm. Foams are continuous structures with continuous walls defining pores throughout the structure. Felts are fibers with interstitial spaces between fibers and includes tangled strands like steel wool.

A catalyst with a large pore support preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porosimetry (assuming cylindrical geometry of the pores) and nitrogen adsorption. As is known, mercury porosimetry and nitrogen adsorption are complementary techniques with mercury porosimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

In some preferred embodiments, the surface active sites of a catalyst are dispersed on a (preferably high surface area, BET surface area>10 $m^2/g$) metal oxide support. Preferred metal oxides include ZnO, $ZrO_2$, $TiO_2$, $SiO_2$, and $Al_2O_3$. The metal oxide, including the presence of catalytically active surface sites, as measured by BET, preferably has a volumetric average pore size of less than 0.1 micrometer (μm). The metal oxide, including the presence of catalytically active surface sites, as measured by BET, nitrogen physisorption, preferably has a surface area of more than 10 $m^2/g$, more preferably a surface area of 20 to 500 $m^2/g$. The metal oxide can be particles, preferably having diameters less than 100 μm, more preferably less than 10 μm, or, more preferably, forms a layer (of agglomerated particles or a continuous film) having a thickness less than 100 μm, more preferably less than 50 μm, and still more preferably a thickness of less than 10 μm.

When an underlying, large-pore substrate is used, a powder can be slurry coated over the substrate at any stage in the preparative process. For example, a high surface area metal oxide could be slurry coated onto the substrate followed by depositing, drying and activating a metal via the impregnation method. Alternatively, a vapor coat or soluble form of alumina (or other high surface area material) could be applied onto the substrate. Other known techniques such as sol-gel, vapor coating, etc. of various materials could also be employed.

Porous catalysts can be prepared, for example, by washcoating on a FeCrAlY felt (obtained from Technetics, Deland, Fla.) where the felt is sized to have a 0.01" (0.25 mm) thickness and 90% porosity. In some embodiments, the mass of wash coat may be on the order of 0.1 gram catalyst per square inch (6.5 $cm^2$) of felt. Coatings can also be applied to other types of structured substrates like metal foams made of stainless steel, copper, alloys, etc. In one preferred embodiment, the large-pore substrate has a corrugated shape that could be placed in a reaction chamber (preferably a small channel) of a steam reformer.

Steam reforming is a process in which hydrogen is stripped from a hydrocarbon fuel by thermal energy provided by a combustor. The process can be represented by the chemical equation:

$$C_aH_bO_c + (2a-x-c)H_2O = xCO + (a-x)CO_2 + (2a-x-c+b/2)H_2$$

In this equation, a must be one or greater, b must be one, preferably two, preferably three or greater, and c can be zero or greater, in some embodiments zero to two. Preferred fuels include the alkanes (methane, ethane, propane, isobutane, etc), alcohols, formic acid, and dimethylether (DME). Formic acid and DME can be reformed under similar conditions as the low molecular weight alcohols.

In alcohol steam reforming, the feed stream contains steam and an alcohol or alcohols. In the present invention, methanol, ethanol, and propanol are preferred with methanol being especially preferred. The reformer mixture molar ratios are preferably between 1-6 steam:carbon, and more preferably between 1.5-3 steam:carbon. In a particularly preferred embodiment, the feed stream into the reforming chamber comprises methanol and water in a ratio of 1:1 to 1:3. The flow rate of reactants will depend on the desired amount of $H_2$ to be produced and on the minimum or maximum capacity of the steam reformer. In some embodiments of the present invention, the steam reformer fuel mixture flow rates are preferably between 0.005 and 10.0 ml/min/microchannel and in some embodiments between 0.05 and 0.5 ml/min/microchannel, where volume is volume of the alcohol and water at room temperature.

The steam reforming reaction can be run over a broad pressure range from sub-ambient to very high. The alcohol steam reforming reaction is preferably carried out at 200-450° C., more preferably 220-375° C., and in some embodiments 240-300° C. In some preferred configurations, the combustion temperature is approximately the same (that is, within 20° C.) as the average reformer temperature (that is, the average temperature of the reforming catalyst). The pressures are preferably between 0 and 400 psig and more preferably between 0 and 10 psig for both the combustor and the reformer. In some preferred embodiments, contact time (based on steam reforming catalyst) of the reforming process stream is less than 2 seconds, in some embodiments 0.1 second or less, and in some embodiments, in the range of 50 ms to 250 ms.

The reformate stream usually comprises hydrogen, carbon dioxide, and carbon monoxide. PEM fuel cells operate have a very low tolerance for CO. They can generally tolerate carbon dioxide and some other gases such as nitrogen, but these act as diluents in the fuel stream. Clean-up of a reformate stream can be performed, for example by a multi-step process consisting of water gas shift reactors, combined with preferential oxidation (also referred to as selective oxidation) and/or carbon monoxide methanation, or by the use of a hydrogen permeable membrane, as disclosed in Pietrogrande et al., "fuel processing," *Fuel Cell Systems*, Chap. 4, Blomen, L J M J and M N Mugerwa, pp. 121-151, Plenum Press, N.Y., 1993.

The methanation reaction is preferably conducted below 290° C., preferably in the range of 220 to 270° C., more preferably 230 to 260° C., where these temperatures refer to the average temperature of a methanation catalyst (in a device) during operation. Temperature of the methanation catalyst is inversely related to contact time. Contact time for the methanation reaction is preferably less than 2 seconds, more preferably in the range of 200 to 800 ms.

In preferred embodiments, more than 80%, more preferably more than 95%, and still more preferably more than 98% of the alcohol in the feed is converted to products, and the product stream comprises less than 1.0 volume % CO, more preferably 300 ppm or less, still more preferably less than 100 ppm, and in some embodiments, about 10 ppm to 90 ppm CO. The product stream exiting the device preferably has a $H_2$:CO ratio of at least 70, more preferably at least 100.

Additional operations can be added to improve performance. For example, unreacted hydrogen from a fuel cell and/or methane from the methanation reaction can be recycled into the combustor to recover their heating value.

Figure 2:
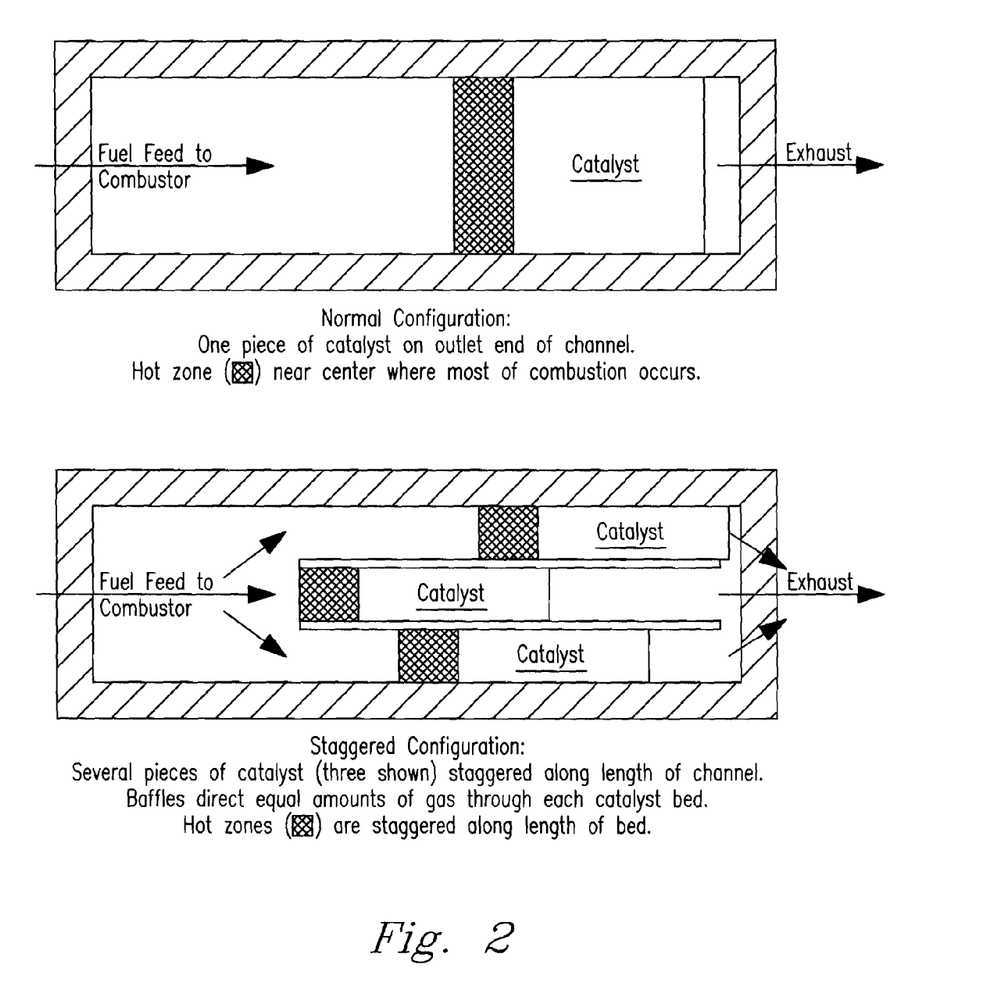
FIG. 2 schematically illustrates a staggered catalyst design in which 3 pieces of catalyst disposed over the width of a channel are staggered along the channel's length.

One aspect of the present invention is the use of a staggered catalyst configuration in the combustion side of an integrated combustion reactor (ICR). The combustion chamber housing the staggered combustion catalyst is separated from a heat sink portion of the ICR by a thermally conductive wall. The advantage of the staggered catalyst configuration is that it spreads out heat over more of the length of the thermally conductive wall. To be effective, the staggered catalyst is disposed in a narrow combustion chamber having at least one dimension of 1 cm or less, more preferably 5 mm or less, and still more preferably 2 mm or less. In the case of a laminated device in which flow is perpendicular to the stacking direction, the height of the combustion chamber is 1 cm or less, more preferably 5 mm or less, and still more preferably 2 mm or less. In some preferred embodiments, the walls of the combustion chamber are essentially planar. The combustion can provide heat to any process requiring thermal energy. In some preferred processes, the combustion chamber provides heat to an endothermic reaction occurring in an endothermic reaction chamber separated from the combustion chamber by a thermally conductive wall. The combustion chamber can be separated from one heat sink by a thermally conductive wall; alternatively, a combustion chamber can be adjacent plural heat sinks, such as sandwiched between two heat sinks. In a preferred embodiment, at least 2, preferably at least 3, and in some embodiments at least 10, catalyst sections (which in some embodiments are equally sized) are staggered along the length of a combustion chamber. Each catalyst section can be applied to the microchannel during a procedure for assembling the apparatus. Multiple catalyst sections may be applied to the microchannel sequentially or simultaneously. In one embodiment, a catalyst section comprises a support, such as a foam or felt, which can be inserted into the microchannel. Multiple catalyst sections or pieces can be made in various sizes to provide the desired catalyst activity in different locations in a microchannel. An example of this configuration with 3 equally sized catalysts is illustrated in FIG. 2. The important characteristic of staggering combustion catalyst is the reduction of hot spot intensity on the opposite side of the thermally conductive wall(s), that is, the temperature profile is rendered much more uniform. Routine experimentation or modeling can be used to optimize placement of the catalyst. Thus, in some preferred embodiments, the staggered catalyst (or system or method utilizing a staggered catalyst) is characterized by the extent of hot spot reduction when compared to the same catalyst disposed in the conventional manner with a straight edge at the front of the combustion chamber when exposed to identical reaction conditions; preferably the hot spot is reduced by at least 5° C., more preferably at least 10° C., or preferably at least 2%, more preferably at least 5% of absolute temperature on the heat sink side. Alternatively, staggering can be defined in terms of distance; for example at least 2 portions (in some embodiments at least 3 portions) with leading edges that differ by at least 2 mm, more preferably at least 5 mm, and in some embodiments, at least 1 cm, as measured in the direction of flow (i.e., combustion chamber length); in yet another alternative, the staggering is preferably at least 5%, more preferably at least 10%, and in some embodiments 10 to 50% of the length of adjacent staggered catalyst portions. The term "portion" does not necessarily imply that the combustion catalyst is a single catalyst piece, although it could be a single piece, it is more commonly plural catalyst pieces or catalyst areas separated by a dividing wall. In some preferred embodiments, walls or support ribs separate each portion of a staggered catalyst. Walls that separate catalyst portions prevent premature reaction that could be caused by diffusion across the width of a reaction chamber. In preferred embodiments, the thermally conductive wall has a thickness of 5.0 mm or less, more preferably 2.5 mm or less.

In some preferred embodiments, pressure drop through each portion of a staggered catalyst is the same. The combustion catalyst can be a porous flow-through catalyst, such as a foam or felt, or a flow-by catalyst such as a wall coating or sized catalyst insert. In a flow-by configuration, the combustion catalyst is preferably disposed on a thermally conductive wall that is adjacent to a heat sink, and in some preferred embodiments the combustion catalyst and a catalyst for an endothermic reaction both contact a thermally conductive wall that defines at least one side of a combustion chamber.

Another embodiment of this invention is to use porous catalyst bodies (such as felts) to control or distribute flow in the channel. Porous catalysts of different porosity, thickness, and/or length could be used. The differences in the porous catalyst bodies would result in pressure drop differences for their respective areas. The channel flow would preferentially follow the low pressure drop route thus controlling or distributing the flow in a desired manner. In addition to flow control this could be used for mixing, and for making a differential temperature reactor (e.g. where the majority of the combustion could be controlled). An example of a differential temperature reactor is shown in U.S. Published Patent Application No. 20030180216 which is incorporated herein as if reproduced in full below.

The invention may also be characterized by reaction characteristics, such as reaction extent (conversion), product selectivity, reaction rate, product species (especially relative to thermodynamic predictions), catalyst stability and lifetime. Additional reaction characteristics can be derived from the data provided in the Examples. The following levels of conversions and/or selectivities and/or thermal gradients and/or thermal efficiencies and/or stabilities are characteristics of some preferred inventive methods. These levels are also characteristic of apparatus when it is tested under the following conditions: when $H_2O$ and methanol in a 1.2:1 molar ratio are fed into the reforming chamber with a contact time of 1.0 second, and fuel and oxygen are combusted in the combustion chamber at a rate sufficient to obtain an average temperature of 320° C. within the combustion chamber. Preferably, in this test, hydrogen and air are combusted with a feed ratio comprising a $H_2:O_2$ ratio of 0.5.

Alcohol conversion in the reforming channel is preferably at least 50%, more preferably at least 80% and still more preferably at least 90%, and yet more preferably at least 98%. Hydrogen selectivity, defined as moles H atoms in $H_2$ in the product gas divided by moles H in all product gases, is preferably at least 50%, more preferably at least 60%, still more preferably at least 85%. $H_2:CO$ ratio in the product stream is preferably at least 70, more preferably at least 100; and still more preferably at least 10,000, and in some embodiments in the range of 100 to 100,000.

In the combustion chamber, fuel conversion (as measured by gas chromatography of the exhaust gas) is preferably at least 70%, more preferably at least 80%, and still more preferably at least 90% and still more preferably at least 98%. Carbon dioxide selectivity, defined as moles $CO_2$ in the exhaust gas divided by of all carbon-and-oxygen-containing product gases, is preferably at least 50%, more preferably at least 70%, still more preferably at least 85%. Conversions higher than 99% and close to 100% for fuels to both the combustor and for the reformer has been attained.

Thermal efficiency is preferably at least 50%, more preferably at least 60% and still more preferably at least about 70%, and in some embodiments 50 to about 60%, in some embodiments 65 to 85%. The systems preferably are stable such that conversion and/or thermal efficiency decreases by 0.1% or less after 100 hours of continuous operation, and, preferably, degrades by 0.1% or less after 5 thermal cycles. Whether a system "degrades" can be defined (and measured) using any of the properties and characteristics discussed herein, for example, alcohol conversion, $H_2$ production, and/or CO levels. Thermal efficiency is defined as the lower heating value of the hydrogen produced divided by the lower heating value of the fuel fed to the reformer and the combustor.

EXAMPLES

Example 1

Figure 3:
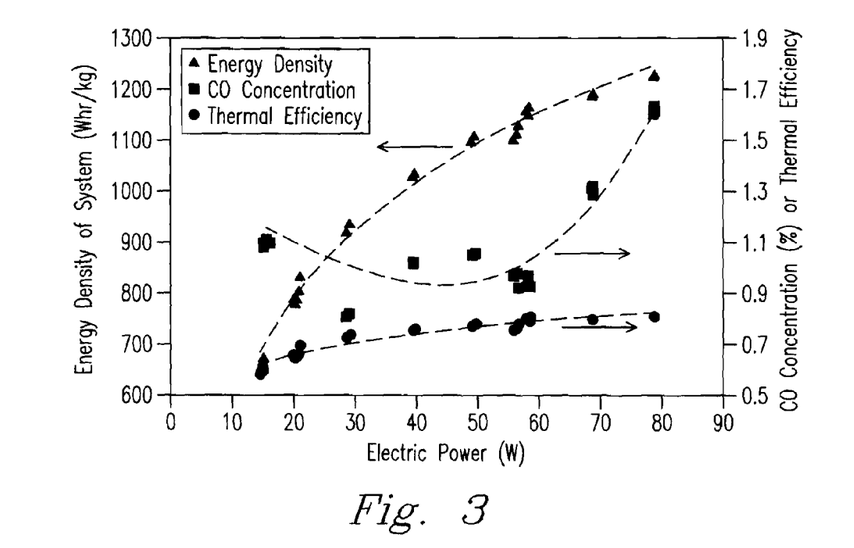
FIG. 3 shows the results of methanol steam reforming in the apparatus of FIG. 1 without a methanizer.

This example used the reactor shown in FIG. 1, but without the methanator catalyst so no CO cleanup was done. The testing was conducted over 2 days at varying temperatures at an output of 15-80 $W_e$ (based on fuel cell utilization and conversion assumptions). This corresponds to hydrogen production rates of 175 mL/min to 930 mL/min (at standard conditions of 273K and 1 atm) from a single-channel reactor. The entire device had a volume of approximately 23 cc (10.5 mm thick by 22.5 mm wide by 97 mm long) and a mass of approximately 125 grams. This gives it an power density of up to 3.4 kW/L and a specific power of up to 640 W/kg. All testing was conducted with a reactant stream of steam to methanol in a molar ratio of 1.2:1 on the steam reforming side and pure methanol and/or hydrogen and air on the combustor side. The results are shown in FIG. 3. CO concentrations are too high in some instances. This is most likely due to a hot spot in the reformer bed (directly opposite of combustor hot spot). Despite this drawback, the reformate contains <<2% CO and usually <1.1% CO on a dry basis—an advantage for the downstream CO mitigation. Also, the steam reforming (SR) contact time for this reactor is very high at low powers (~600 ms at 20 W). The methanol conversion was >99%. Thermal efficiency ranged from about 60% to about 80%. This design would be viable to provide hydrogen to a high temperature PEM (operation from 120-200° C.) fuel cell, and provides a high hydrogen concentration—73-75% on a dry gas basis. Dry gas basis means that the steam has been removed (excluded from the calculation). In general, hydrogen concentration on a dry gas basis is preferably above 60%, more preferably above 70%, and in some embodiments in the range of 60 to 75%.

Example 2

Figure 4:
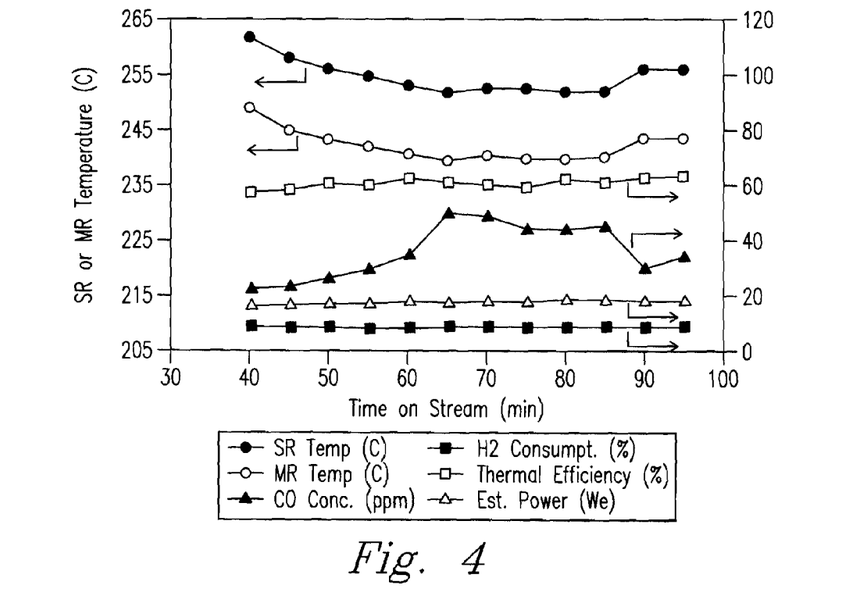
FIG. 4 shows results of methanol steam reforming in the apparatus of FIG. 1 with a methanizer.

This example is substantially the same as Example 1, except that the methanator catalyst was inserted into the device and therefore CO methanation (removal) occurred. The volume and mass remained essentially unchanged. Testing was conducted for about a day. The power output was about 18 We. The results are shown in FIG. 4. As can be seen, temperature of the steam reforming chamber was about 255° C., while the methanator ran at about 240° C. All results shown were obtained at full conversion of methanol (>99%). Despite the hot-spot concerns mentioned above for SR-only operation, this combined reactor performed well at ~18 We, constantly yielding 20-50 ppm CO over the course of about 50 minutes. The continually changing reactor temperatures were due to lack of automatic control system on the test stand, and are not a reflection on the performance of the reactor itself. CO was sufficiently mitigated at the expense of no more than 10% H2 consumption. This performance represents ~1.23 mL/We. This device is designed to provide hydrogen for low temperature PEM fuel cell.

Example 3

Figure 5:
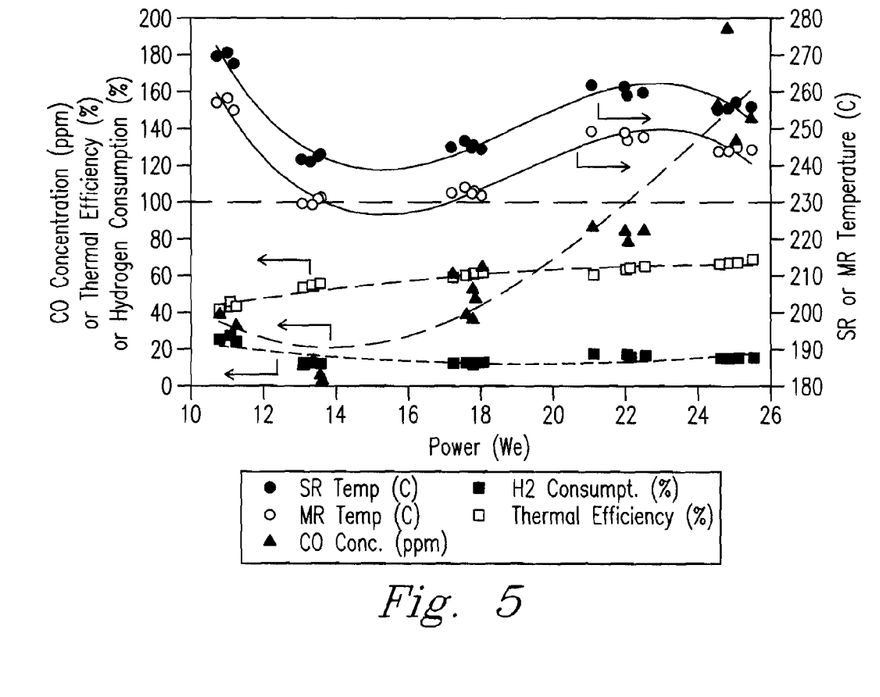
FIG. 5 shows results of methanol steam reforming in the apparatus of FIG. 1 with a methanizer.

This example was the same apparatus as Example 2. Results are shown in FIG. 5. Target of operation was <100 ppm CO, with reasonable $H_2$ consumption and reasonable efficiency. Testing was conducted over several days. Flow rates and temperature were varied to achieve low CO reformate (<100 ppm) at various power outputs. The results are shown in FIG. 5. All results shown were obtained at full conversion of methanol. The methanator consumed about 15 to 20% of the hydrogen produced in the steam reformer. Power outputs from 11 We up to 22 We were obtained with substantially less than 100 ppm CO. This device is designed to provide hydrogen for low temperature PEM fuel cell.

Example 4

Figure 6:
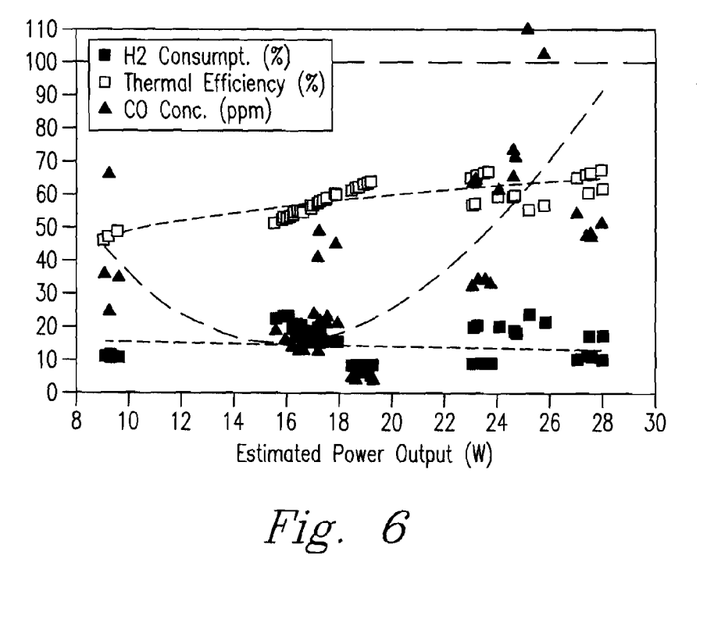
FIG. 6 shows results of methanol steam reforming in the apparatus as in FIGS. 4 and 5 but with a staggered combustion catalyst.
Figure 7:
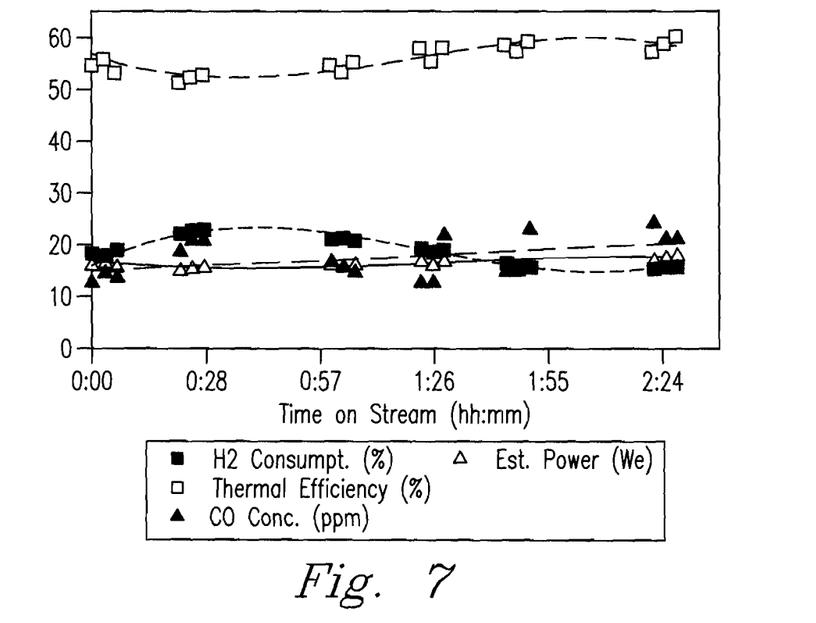
FIG. 7 shows stable performance of methanol steam reforming in the apparatus of FIG. 1 with a methanizer and a staggered combustion catalyst. The testing conditions were: a reformer temperature of 266-283° C. at 600 ms contact time; a methanizer temperature of 246-262° C. at 370 ms contact time; reactor feed 64 wt % methanol, 40 wt % water; 0.45 mol/hr.

This Example used apparatus of the same design as Examples 2 and 3 except that the combustion chamber contained a staggered combustion catalyst. The device volume and mass were the same as example 1. Testing was conducted at 9-28 W, 248-294 C reformer temperature; and 225-273 C methanator temperature. The results are shown in FIG. 6. All results shown were obtained at full conversion of methanol under steady-state conditions. This device demonstrated an operating range of 9 to 28 watts under the conditions tested. Therefore this device has a power density of approximately 1.2 kW/L and a specific power of 224 W/Kg. It is likely this range could be expanded if explored more thoroughly. For all these operating conditions, the CO level was maintained at less than 100 ppm (except for two data points), while the thermal efficiency of the device ranged from 46% up to 67%, with hydrogen consumption ranging from 9% to 24%. The improved selectivity is believed to be due to the reduced hot spot in the steam reformer. This device is designed to provide hydrogen for low temperature PEM fuel cell.

Example 5

This Example used the same type of apparatus as Example 4 with target power output of 20 W over time to show stability of operation. This device was operated for about 2.5 hours continuous operation at 16-18 W output, and showed stability of operation, despite the absence of a feedback-loop based control system in this proof-of-principle laboratory setup. Over the course of the demonstration, the reactor maintained low CO levels between 13 and 24 ppm. At the same time, thermal efficiency ranged from 51% to 60%, and hydrogen consumption ranged from 15% to 23%. This device is designed to provide hydrogen for low temperature PEM fuel cell.

We claim:

1. A compact steam reformer, comprising:
   a reactant preheat section;
   a steam reforming reaction chamber comprising a steam reforming catalyst;
      wherein the steam reforming reaction chamber is in conductive thermal contact with the reactant preheat section such that, during operation, heat from the steam reforming reaction chamber can be conducted directly across a reaction chamber wall into the reactant preheat section;
      wherein the reactant preheat section comprises an inlet and an outlet, and wherein the reactant preheat section outlet is disposed such that, during operation, flow from the reactant preheat section outlet flows into the steam reforming reaction chamber;
   a combustion chamber adjacent to the steam reforming reaction chamber and separated from the steam reforming reaction chamber by a chamber wall;
      wherein the combustion chamber comprises a combustion catalyst and wherein the combustion chamber has a length and wherein the combustion chamber length is defined in the direction of flow through the combustion chamber, and begins at a point where flow first encounters catalyst and ends where flow last encounters catalyst; and
   a combustion preheat chamber;
      wherein the combustion chamber is in conductive thermal contact with the combustion preheat section such that, during operation, heat from the combustion chamber can be conducted through a combustion chamber wall into the combustion preheat section;
      wherein the combustion chamber comprises an inlet and an outlet, and wherein the combustion chamber outlet is disposed such that, during operation, flow from the combustion chamber outlet flows into the combustion preheat section.

2. The compact steam reformer of claim 1 further comprising a methanation catalyst disposed in the reactant preheat section.

3. The compact steam reformer of claim 1 wherein the reactant preheat section comprises methanator, vaporizer and superheat subsections.

4. The compact steam reformer of claim 1 comprising a stack of layers, comprising the following layers in sequential order:
   a methanation layer comprising a methanation catalyst;
   a vaporizer layer;
   a superheat layer;
   the steam reforming reaction chamber;
   the combustion chamber; and
   a preheater layer.

5. The compact steam reformer of claim 4 comprising at least 3 preheat layers in the combustion preheat chamber.

6. A compact steam reformer, comprising:
   a reactant preheat section;
   a steam reforming reaction chamber comprising a steam reforming catalyst;
      wherein the steam reforming reaction chamber is in conductive thermal contact with the reactant preheat section such that, during operation, heat from the steam reforming reaction chamber can be conducted directly across a reaction chamber wall into the reactant preheat section;
      wherein the reactant preheat section comprises an inlet and an outlet, and wherein the reactant preheat section outlet is disposed such that, during operation, flow from the reactant preheat section outlet flows into the steam reforming reaction chamber;
   a combustion chamber adjacent to the steam reforming reaction chamber and separated from the steam reforming reaction chamber by a chamber wall;
      wherein the combustion chamber comprises a combustion catalyst; and
   a combustion preheat chamber;
      wherein the combustion chamber is in conductive thermal contact with the combustion preheat section such that, during operation, heat from the combustion chamber can be conducted through a combustion chamber wall into the combustion preheat section;
      wherein the combustion chamber comprises an inlet and an outlet, and wherein the combustion chamber outlet is disposed such that, during operation, flow from the combustion chamber outlet flows into the combustion preheat section wherein the combustion channel has a height of 10 mm or less and wherein the combustion comprises a combustion catalyst staggered over the width of the combustion chamber, such that, at the beginning of the combustion chamber's length, catalyst is present in no more than 70% of the combustion chamber's width.

7. The compact steam reformer of claim 1 wherein the steam reforming reaction chamber comprises a catalyst comprising CuZnAl, Pd/ZnO, Ru, Pt, Rh, or combinations of these.

8. The compact steam reformer of claim 2 wherein a preheat layer is disposed between the steam reforming reaction chamber and a methanation layer that comprises the methanation catalyst.

9. The compact steam reformer of claim 8 wherein the methanation catalyst comprises Ru on an alumina support.

10. The compact steam reformer of claim 9 wherein the steam reforming reaction chamber comprises a catalyst having a porosity of at least 80%.

11. A prebonded assembly having the structure of the compact steam reformer of claim 1.

12. A compact steam reformer system, comprising
the compact steam reformer of claim 1 comprising alcohol and steam flowing through the reactant preheat section and hydrogen flowing through the reactant preheat section.

13. The compact steam reformer system of claim 12 comprising alcohol and steam flowing through the reactant preheat section and hydrogen flowing through the reactant preheat section.

14. A method of producing H2 comprising passing CO and H2O into the compact steam reformer of claim 1.

15. The method of claim 14 wherein the combustion chamber has a volume/power ratio of 0.017 ml/We or less.

16. The method of claim 14 wherein the integrated steam reformer has a volume/power ratio of 0.82 ml/We or less.

17. The method of claim 14, comprising:
passing a reactant stream comprising a hydrogen source and water into the reactant preheat section and through a preheat layer in the reactant preheat section and then into the steam reforming reaction section where the hydrogen source and water react to form a product stream comprising H2;
passing the product stream comprising H2 through a layer parallel to the preheat layer and transferring heat through a wall from the product stream to the reactant stream;
passing a combustant stream comprising a fuel and an oxidant into the combustion preheat section and through a preheat layer in the combustion preheat section and then into the combustion chamber where the fuel and oxidant combust to form an exhaust stream;
wherein heat from the combustion passes through a wall into the steam reforming reaction section; and
passing the exhaust stream through a layer parallel to the preheat layer and transferring heat through a wall from the exhaust stream to the combustant stream.

18. Laminated apparatus for integrated thermal reaction, comprising the following layers in stacked in sequential order:
an endothermic preheat layer;
an endothermic reaction chamber;
an exothermic reaction chamber; and
an exothermic preheat layer;

wherein a reaction chamber wall separates the endothermic reaction chamber and the exothermic reaction chamber;
wherein a first fluid flow path connects the endothermic preheat layer with the endothermic reaction chamber; and
wherein a second fluid flow path connects the exothermic preheat layer with the exothermic reaction chamber
wherein the endothermic reaction chamber comprises a steam reformer and includes a steam reforming catalyst, and
wherein the exothermic reaction chamber comprises a combustion chamber and includes a combustion catalyst.

19. The laminated apparatus of claim 18 further comprising a methanator connected to the first fluid path.

20. The laminated apparatus of claim 18 further comprising a preferential oxidation chamber connected to the first fluid path.

21. A method of conducting thermal chemical reactions in the apparatus of claim 18, comprising:
passing a first reactant stream into and through the endothermic preheat layer and then into the endothermic reaction chamber wherein the reactant reacts endothermically to form an endothermic product stream;
passing the endothermic product stream into a heat transfer layer that is adjacent to the endothermic preheat layer and passing heat from the endothermic product stream into the reactant stream through a wall that separates the heat transfer layer from the endothermic preheat layer; and simultaneously,
passing a second reactant stream into and through the exothermic preheat layer and then into the exothermic reaction chamber wherein the reactant reacts exothermically to form an exothermic product stream;
passing the exothermic product stream into a heat transfer layer that is adjacent to the exothermic preheat layer and passing heat from the exothermic product stream into the second reactant stream through a wall that separates the heat transfer layer from the endothermic preheat layer; and
wherein heat from the exothermic reaction is conducted into the endothermic reaction chamber through a reaction chamber wall that separates the enothermic reaction chamber and the exothermic reaction chamber.

22. The method of claim 21 wherein the endothermic reaction comprises steam reforming; wherein the exothermic reaction comprises combustion; wherein the laminated apparatus comprises a preferential reaction chamber in the first fluid flow path; wherein the endothermic product stream comprises CO and flows into the preferential reaction chamber wherein at least a portion of the CO is converted to $CO_2$.

23. The method of claim 17 wherein the product stream comprising H2 has an H2:CO ratio of at least 70.

24. The method of claim 17 wherein the product stream comprising H2 has an H2:CO ratio in the range of 100 to 100,000.

25. The method of claim 14 wherein the combustion chamber has a volume/power ratio of 0.011 ml/We or less.

26. The method of claim 14 wherein the combustion chamber has a volume/power ratio in the range of 0.007 and 0.004 ml/We.

27. The method of claim 14 wherein the integrated steam reformer has a volume/power ratio of 0.55 ml/We or less.

28. The method of claim 17 wherein the reforming chamber has a volume/power ratio of 0.03 ml/We or less.

* * * * *